United States Patent
Brox et al.

[11] Patent Number: 4,998,241
[45] Date of Patent: Mar. 5, 1991

[54] ECHO CANCELLER

[75] Inventors: Wolfgang Brox, Kalchreuth; Peter Vary, Herzogenrath, both of Fed. Rep. of Germany

[73] Assignee: U.S. Philips Corporation, New York, N.Y.

[21] Appl. No.: 444,597

[22] Filed: Dec. 1, 1989

[30] Foreign Application Priority Data

Dec. 1, 1988 [DE] Fed. Rep. of Germany ....... 3840433

[51] Int. Cl.$^5$ .............................................. H04J 3/00
[52] U.S. Cl. .................................. 370/32.1; 379/406; 379/411
[58] Field of Search ............... 379/388, 390, 406, 410, 379/411; 370/32.1

[56] References Cited

U.S. PATENT DOCUMENTS

| | | | |
|---|---|---|---|
| 4,360,712 | 11/1982 | Horna | 379/406 |
| 4,479,036 | 10/1984 | Yamamoto et al. | 379/410 |
| 4,535,206 | 8/1985 | Falconer | 379/410 |
| 4,648,111 | 3/1987 | Ito | 379/411 |

FOREIGN PATENT DOCUMENTS 0053202 6/1980 European Pat. Off.
3733132 4/1989 Fed. Rep. of Germany.

OTHER PUBLICATIONS

An Adaptive Echo Canceller with Variable Step Gain Method, Yamamoto et al.; 1/82.
Echo Canceller Systems; European Patent Application, Yukio; 8/84.

Primary Examiner—Jin F. Ng
Assistant Examiner—Jhancy Augustus
Attorney, Agent, or Firm—Anne E. Barschall

[57] ABSTRACT

An echo canceller is described comprising an adaptive filter (15). The adaptation rate of the adaptive filter (15) is controlled by means of a control unit (29) determining the appropriate control signal in response to its input signals (x(k), u(f), e(k)). If the described echo canceller is inserted, for example, in the subscriber set of a telephone network, the adaptation process is to be effected only when the far-end subscriber is talking and the near-end subscriber is silent. If such a decision is automatically made with the associated signals (x(k), u(k)), an erroneous decision may at least temporarily considerably degrade the quality of the telephone communication. For this reason, the adaptation rate of the adaptive filter (15) is provided to be controlled in a gradual manner by means of the control unit (29) in response to suitably chosen mean values of its three input signals (x(k), u(k), e(k)), when the far-end subscriber is talking.

10 Claims, 2 Drawing Sheets

ECHO CANCELLER

The invention relates to an echo canceller comprising an adaptive filter, whose adaptation rate is controlled by a control unit determining the appropriate control signal in response to its input signals.

Echo cancellers having these characteristic features are used, for example, in telephone networks to avoid the speech signal from a far-end subscriber being sent back as an echo to this far-end subscriber. The electric signal of the far-end subscriber can be converted into an acoustic signal, e.g. by the loudspeaker of a subscriber telephone set, reaches the microphone of the set as an acoustic signal and then arrives at the far-end subscriber over the outgoing line, insofar this signal is not suppressed by an echo canceller. Part of this signal loop is called echo path; it is the part that is located on the side of the inserted echo canceller which faces the near-end subscriber.

Problems similar to those occurring with echo cancellation also occur with noise cancellation during headphone reception in a headset with microphone (cf. for this purpose German patent document No. DE 37 33 132). Consequently, in the sequel the meaning of the word "echo canceller" is to comprise the meaning of the word "noise canceller". However, echo cancellation in the narrower sense remains the preferred field of application of the circuit mentioned hereinbefore.

An echo canceller having the above characteristic features is described in, for example, European patent document No. EP 0 053 202 B1. The speech signal from the far-end subscriber is applied to an adaptive filter which ideally has the same transmission characteristics as the echo path. The output signal of the adaptive filter is subtracted from the microphone signal which consists of superimposed echo and speech signals of the near-end subscriber, so that an echo-free send signal is produced at the output of the subtractor means necessary for this operation.

Generally, however, there are considerable discrepancies between the transmission characteristics of the adaptive filter and those of the echo path which are removed by a control process. For, in addition to the signal from the far-end subscriber also the output signal of the subtractor means is supplied to the adaptive filter. In response to this signal the transmission characteristics of the filter are changed with a view to minimizing the mean power of the error signal (output signal of the subtractor means). The control process is known as adaptation process.

It will be evident that this control process may lead to the desired result only when the far-end subscriber is talking. If the output signal of the subtractor means is set to zero in such a call situation, the ideal case will be attained. When, however, the near-end subscriber changes his position relative to the microphone while the far-end subscriber is talking, the transmission characteristics of the echo path will then change automatically so that the adaptation process will generally never come to an end.

As mentioned hereinbefore, during the call, situations do occur in which the control process would lead to undesired results and, consequently, in such situations the process is to be interrupted. This specifically means that the adaptation rate of the filter in such situations has to be zero. A situation of this type occurs when:
(a) both subscribers are talking,
(b) only the near-end subscriber is talking, and
(c) no subscriber is talking.

Adaptation is to be effected when:
(d) only the far-end subscriber is talking.

In situation (c) the adaptation rate of the filter is to be made zero because otherwise the disturbing noise will be reduced to zero at the output of the subtractor means. This operation would lead to an adaptation of the transmission characteristics of the filter which are irrelevant to the transmission characteristics of the echo path. With due alteration of details this also applies to the situations (a) and (b).

In order to recognize automatically the call situations (a) to (d), a control unit is provided in European patent document No. EP 0 053 202 B1 which controls the adaptation rate in response to three signals. These three signals are the signal from the far-end subscriber, the output signal of the subtractor means (error signal) and the microphone signal. The signals are evaluated and converted into a binary variable whose value decides on whether the transmission characteristics of the filter are to be modified further or retained or, worded differently, whether the adaptation rate is to be maintained at its maximum level or is to be made zero.

In order to avoid any misunderstanding it should be observed that the termination of the adaptation process is not equivalent to switching off the filter or disabling it; the adaptive filter remains enabled in all situations (a) to (d) in the same sense as the echo path remains enabled.

The known control of the adaptation rate leads to unsatisfactory results because erroneous decisions are hardly avoidable in practice. Stopping the adaptation process erroneously would be less disturbing than starting same erroneously. If, for example, in the situation (a) a sudden strong attenuation occurs in the echo path and if at the same time the speech level of the near-end subscriber in the microphone signal is small (the near-end-subscriber, for example, holds his hand before the microphone when talking), the situation (d) is simulated because only fixed thresholds for signal levels are used to recognize the situations (a) to (d). The adaptation process will then be started at full speed and due to the speech portions of the near-end-subscriber—which are to be considered disturbing signal portions in this case—will lead to a transmission characteristic of the adaptive filter which may be distinctly different from the characteristic of the echo path. If now the situation (a) is recognized properly (for example, the near-end subscriber speaks up) the adaptation process is stopped, but the filter continues to operate with degraded setting of its transmission characteristics, which specifically means that the echo is suppressed insufficiently and the speech of the near-end subscriber is distorted.

It is an object of the invention to provide an echo canceller of the type mentioned in the preamble in which distortions and insufficient echo cancellation having the above causes are reduced.

According to the invention, this object is achieved by means of an echo canceller of the type mentioned in the preamble which has the following characteristic features:

1.1 The control unit comprises an arithmetic unit determining for each of the input signals a mean value depending on the signal power;

1.2 The control unit comprises a decision circuit establishing whether the mean value of the input signal of the adaptive filter is situated above or below a threshold, and with whose output signal the adaptation rate is set to zero for a mean value below the threshold; and 1.3 From the mean values of the signals, the arithmetic unit of the control unit determines a threshold value which bears a proportion to the mean value of the echo-cancelled signal and controls the adaptation rate in dependence on this proportion, in the case that this adaptation rate is not set to zero by the decision circuit.

The echo canceller according to the invention is advantageous in that with a supposed change from one of the situations (a), (b) and (c) to situation (d) the adaptation rate can be changed gradually, so that large deviations from the optimum filter characteristics caused by disturbing signals only occur rarely or not at all. With the echo canceller according to the invention the influence of the disturbing signals is thus smaller than with the above prior art canceller because the threshold value can be selected such that the adaptation rate will be reduced when the disturbance increases and vice versa.

Advantageous embodiments of the invention will be stated in the sub-claims and further explained hereinbelow.

The invention will now be described more in detail, by way of a non-limitave exemplary embodiment, with reference to the accompanying drawings, in which.

Figure 1:
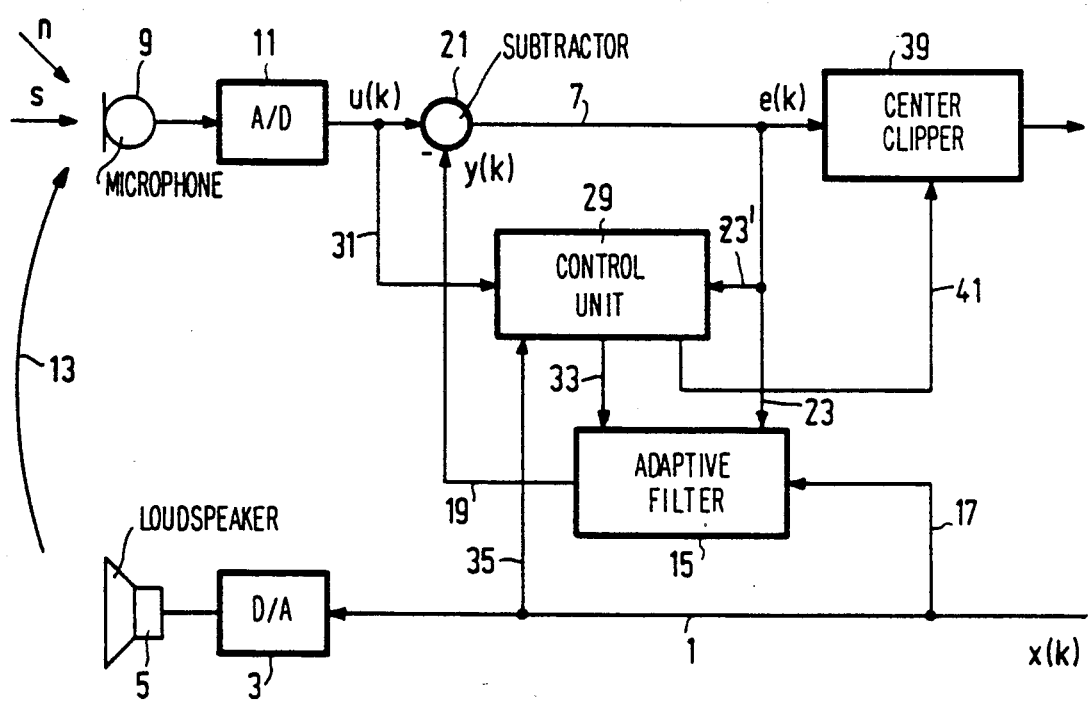
FIG. 1 shows a telephone subscriber set having an echo canceller in which set the invention has been realized.

In the embodiment of the invention the echo cancellation is effected by means of a digital, linear, non-recursive and adaptive filter 15. Consequently, all signals which are of importance to the echo cancellation occur as digitized samples at equidistant instants, symbolized by integer variables in brackets, for example, k. Before the signal x(k) of the far-end subscriber is applied to a loudspeaker 5 over a line 1, it is converted into an analog signal by a digital-to-analog converter 3 and reaches a microphone 9 of the subscriber telephone set through an echo path 13. The microphone 9 is also reached by ambient noise n as well as the acoustic signal s from the near-end subscriber. The superpositioning of these three signals is sampled by an analog-to-digital converter 11, digitized and applied to an input of a subtractor means 21 as a microphone signal u(k). Over a line 19 the output signal y(k) of the adaptive filter 15 is applied to a second input of the subtractor means 21. The subtractor means 21 subtracts the signal y(k) from the signal u(k). After passing through a unit 39 known as centre clipper, the resulting difference or error signal e(k) is transmitted to the far-end subscriber over the output line 7 of the subtractor means 21. This error signal is simultaneously applied to the adaptive filter 15 and a control unit 29 through line sections 23 and 23' respectively. The control unit also receives the signal x(k) over a line 35 and the signal u(k) over a line 31. These three signals are processed by the control unit 29 into two control signals, the first signal arriving at the adaptive filter 15 over a line 33 and the second signal arriving at the centre clipper 39 over a line 41.

With the linear non-recursive filter 15 the input data x(k) are related to the output data y(k) by the equation $$y(k) = \sum_{i=1}^{n} h_i(k) \times (k - i + 1) \quad (1)$$

where the quantities $h_i(k)(i=1, 2, 3 \ldots N)$ represent the N filter coefficients at the sample instant k. For simplicity the N filter coefficients are combined to an N-component vector $\underline{h}(k)$ and likewise is done with the signal values $x(k), x(k-1), \ldots x(k-N+1)$. The corresponding vector is $\underline{x}(k)$. The right-hand side of the equation (1) then represents the scalar product of the two vectors at the instant k. For the instant $k+1$ the vector $\underline{h}(k+1)$ is determined in accordance with the equation $$h(k+1) = h(k) + d(k) \quad (2).$$

The mathematical problem to be resolved consists of computing the modification term $\underline{d}(k)$ by using signal values and filter coefficients known at instant k, in a manner such that in the absence of disturbing signals, the error signal e(k) on the output line of the subtractor means 21 will practically be made zero after a finite number of modification steps. Various algorithms are known for such a computation (compare for this purpose K. Ozeki, and T. Umeda: "An Adaptive Filtering Algorithm Using an Orthogonal Projection to an Affine Subspace and Its Properties", Electronics and Communications in Japan, Vol. 67-A, No. 5, 1984, pp. 19-27).

The adaptation rate depends, inter alia, on the algorithm used. The equation (2) now offers the possibility, irrespective of the algorithm used, to reduce the adaptation rate and subsequently increase it again; the maximum value of this rate is determined by the algorithm used. If the adaptation rate is controlled in accordance with European patent document No. EP 0 053 202 B1 only two values are possible, either zero or the maximum value.

If, however, in equation (2), the computed vector $\underline{d}(k)$ is multiplied by a factor $\mu$—called step-size factor in this context—whose value may continuously vary between zero and one, the adaptation rate will change accordingly. If $\mu=1$, the maximum value of the adaptation rate will be determined by the algorithm, and if $\mu=0$ its value will also be zero. What value $\mu$ has and, consequently, the adaptation rate at instant k, is determined by the value of a control signal at instant k.

Figure 2:
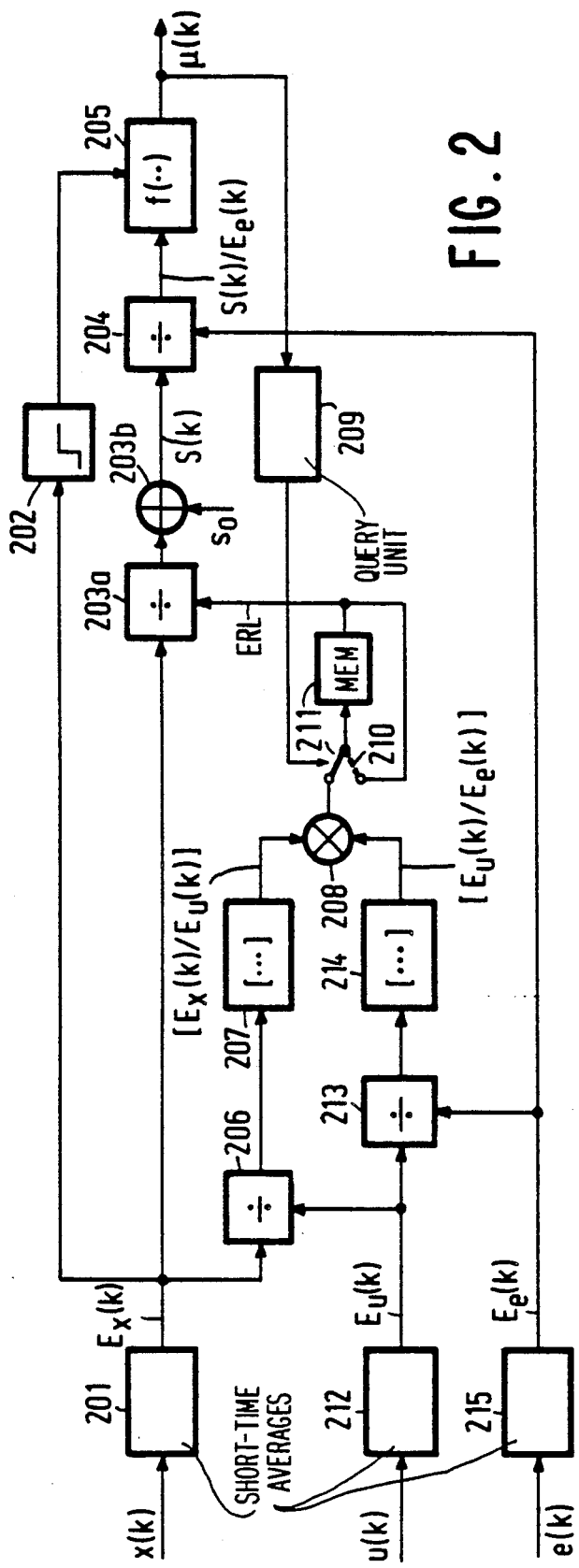
FIG. 2 shows a block diagram of specific functional modules in a control unit of an echo canceller as shown in FIG. 1.

In order to produce these control signals the control unit 29, by means of functional modules 201, 212 and 215 (FIG. 2), determines short-time average values $E_x(k)$, $E_u(k)$ and $E_e(k)$ from its input signals x(k), u(k) and e(k), which average or mean values depend on the power of the signals.

Short-time average values $E_w(k)$ have appeared to be suitable that are solutions of the equation $$E_w(k) = (1-\beta) \cdot E_w(k-1) + \beta \cdot w(k) \quad (3)$$

Figure 3:
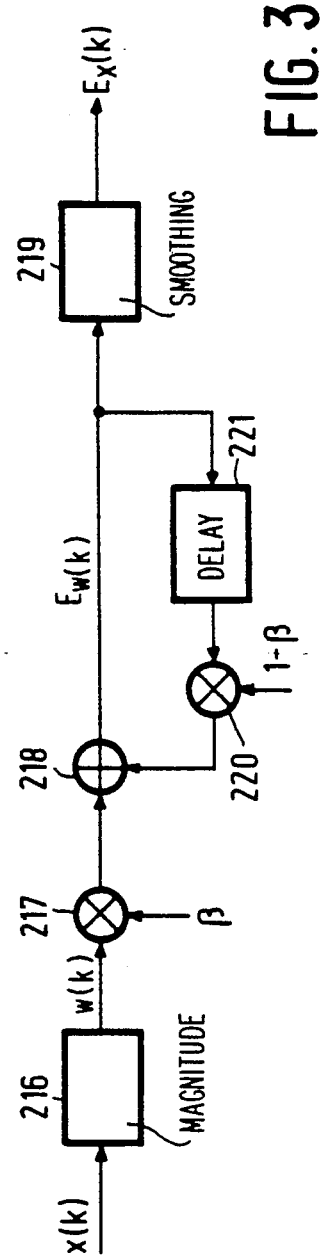
FIG. 3 shows a block diagram of functional modules of a short-time average module of FIG. 2.

(cf. for this purpose the bottom part of FIG. 3 comprising functional modules 216, 217, 218, 220 and 221) where w(k) represents the square root or the magnitude (absolute value) of the samples of one of the above input signals (this magnitude is determined by the functional module 216) and index w shows which of the three signals is referred to in a specific case. $\beta$ is a so-called smoothing parameter whose most favourable value for speech signals is situated at 0.05 if they are sampled at 8 kHz.

Because the short-time average values which are solutions to equation (3) vary too much with time to be processed further (cf. hereinbelow), they are smoothed non-linearly (by means of a funtional module 219), so that the maximum of the 128 last values of the solutions of (3) is used as the smoothed value. For simplicity these non-linearly smoothed values and the solutions to (3) will not be distinguished symbolically in the sequel.

By means of the average value $E_x(k)$ a threshold value detector 202 (possibly one with hysteresis) first decides whether the far-end subscriber is talking or not. If the value of $E_x(k)$ is situated below a threshold it is supposed that the call situation (b) or (c) is concerned. Since in both cases the adaptation process is to be interrupted, the adaptation rate will immediately be set to zero, discarding the values of all other signals.

If the value of $E_x(k)$ is situated above a threshold, it will be a matter of call situation (a) or (b). With automatic distinction between call situations (a) and (b) one will not proceed according to the "yes-no principle", but operations will gradually be effected as follows:

first a time-dependent threshold value S(k) according to the equation $$S(k) = S_o + E_x(k)/ERL \quad (4)$$

will be determined (cf. funtional modules 203a and 203b), where $S_o$ is a constant whose value is to be determined only once when the system is put into operation and ERL is an estimate of the long-time average value of the total echo return loss, that is to say, ERL is an estimate of $[E_x(k)/E_e(k)]$, where the square brackets indicate an averaging over long periods of time.

The following value is then assigned to the step size $\mu$ (by means of functional modules 204 and 205):

$$\mu(k) = f(S(k)/E_e(k)) \quad (5)$$

where f is a monotonically increasing function of its argument, whose absolute maximum is "one" and whose absolute minimum is "zero". A function f which appeared to be favourable has a logarithmic variation between 0 and 1.

From the definition of the threshold value S(k) it will be evident that the smaller the average value $E_e(k)$ the larger the argument of the function f will be. When the near-end subscriber starts talking, the average value $E_e(k)$ will become larger and hence $\mu$ will become smaller. Consequently, $\mu$ can be interpreted as the probability that the near-end subscriber is not talking. If $\mu$ is 1, he will definitely not be talking; if $\mu = 0$ he will definitely be talking.

The estimate ERL of the equation (4) is selected to be 1 (stored in a memory 211) at the beginning of a call. If $\mu = 1$, the value of ERL will be updated during this period of time. This is effected in a manner such that a long-time average value $ERL_o$ (echo return loss of the echo path) of the quotient $[E_x(k)/E_u(k)]$ is formed (cf. functional modules 206 and 207), and a long-time average value ERLE (echo return loss of the adaptive filter) of the quotient $[E_u(k)/E_e(k)]$ (cf. functional modules 213 and 214), and the product (cf. functional module 208) of these two long-time average values is substituted for the previous value of ERL.

Updating the value of ERL is always effected if the above assumptions ($\mu = 1$) are satisfied, and in that case by means of a query unit 209 and a switch 210 as well as a memory 211.

The centre clipper 39 of the control unit 29 is controlled in exactly the same way. If $\mu = 1$, all amplitudes in the error signal e(k) that have values smaller than a certain maximum value will be suppressed. If $\mu$ becomes smaller, also this maximum value will be reduced. If $\mu = 0$ the maximum value will also be zero.

We claim:
1. An echo canceller comprising
   (a) an adaptive filter having first input means, control input means, and an adaptation rate controllable in response to a control signal received at the control input means;
   (b) a control unit for producing the control signal for the adaptive filter and including:
      (i) a plurality of input means for receiving respective input signals having respective signal powers;
      (ii) means for determining respective mean values of the respective input signals based on the respective signal powers, which input signals include a signal received at the first input means and an echo cancelled signal;
      (iii) a decision circuit for
         (A) establishing whether the mean value of the signal received at the first input means exceeds a first threshold value; and
         (B) supplying an output signal for setting the adaptation rate to zero when the mean value of the signal received at the first input means is below the first threshold value;
   (c) means for supplying a second threshold value which is a function of the mean value of an echo cancelled signal, which second threshold value controls the adaptation rate according to the function in the case in which the adaptation rate is not set to zero by the decision circuit.
2. The echo canceller of claim 1 wherein
   the input signals to the control unit comprise a signal from a local microphone; and
   the input signal received at the first input means is a signal from a remote transmitter.
3. Echo canceller as claimed in claim 1, wherein the second threshold value comprises a sum of
   (a) a time-constant part and
   (b) the ratio of
      (i) the respective mean value of the input signal at the first input means to
      (ii) an estimate of a total echo return loss.
4. Echo canceller as claimed in claim 3, characterized in that in the time intervals in which the decision circuit has not set the adaptation rate to zero and the ratio between the threshold value and the mean value of the echo cancelled signal exceeds a limit, the estimate of the total echo return loss is updated.
5. Echo canceller as claimed in claim 4, characterized in that the product of two partial echo return losses is used for the estimate of the total echo return loss, the first factor consisting of the echo return loss of the echo path itself and the second factor consisting of the echo return loss of the adaptive filter.
6. Echo canceller as claimed in one of the preceding claims, characterized in that the echo-cancelled signal passes through a centre clipper, in which the magnitude of the signal amplitudes to be suppressed is also controlled in dependence on the ratio of the second threshold value to the mean value of the echo-cancelled signal.
7. An echo canceller comprising:

(a) first input means for coupling with a local microphone to receive a local signal (u(k));
(b) second input means for coupling to receive a remote signal (x(k));
(c) a subtractor for subtracting an estimated echo value (y(k)) from the local signal to produce an echo cancelled signal (e(k));
(d) an adaptive filter having
   (i) first input means coupled to receive the remote signal;
   (ii) second input means coupled to receive the echo cancelled signal;
   (iii) control input means coupled to receive a control signal for controlling an adaptation rate of the filter;
   (iv) an output for supplying the estimated echo value;
(e) a control unit having
   (i) first input means coupled to receive the local signal;
   (ii) second input means coupled to receive the echo cancelled signal; and
   (iii) third input means coupled to receive the remote signal;
   (iv) an output for supplying the control signal;
   (v) a plurality of means for supplying respective short-time averages of the local, echo cancelled, and remote signals ($E_x(k)$, $E_u(k)$, and $E_e(k)$);
   (vi) first means for setting the control signal to set the adaptation rate to zero when the respective short-time average of the remote signal falls below a first threshold value;
   (vii) second means for setting the control signal to set the adaptation rate according to a second threshold value when the adaptation rate is not set to zero, which second threshold value is a function of the short-time average of the echo cancelled signal.

8. The echo canceller of claim 7, wherein the means for supplying respective short-time averages calculates those averages according to the respective equations $$E_w(k) = (1-\beta)*E_w(k-1) + \beta*w(k)$$

where k is a variable representing discrete sampling of time; w is a variable which can represent any one of the local, echo cancelled, and remote signals; and $\beta$ is a smoothing parameter.

9. The echo canceller of claim 7 wherein the second means for setting comprises means for calculating the second threshold value according to the equation:

$$\mu(k) = f(S(k)/E_e(k))$$

where $\mu(k)$ is the second threshold value; k is a variable representing discrete sampling of time; f is a monotonically increasing function whose absolute maximum is one and whose absolute minimum is zero; $E_e(k)$ is the respective short-time average of the echo cancelled signal; and S(k) is determined according to the following equation:

$$S(k) = S_o + E_x(k)/ERL$$

where $S_o$ is a time-independent value set when the echo canceller is started; $E_x(k)$ is the respective short-time average of the remote signal; and ERL is an estimate of the long-time average of total echo return loss.

10. The echo canceller of claim 9 wherein the means for calculating calculates ERL as a product of (a) a first ratio of the short-time average of the remote signal to the short-time average of the local signal; and (b) a second ratio of the short-time average of the local signal to the short-time average of the echo-cancelled signal.

* * * * *